(12) United States Patent  (10) Patent No.: US 8,140,797 B2
Robini et al.  (45) Date of Patent: Mar. 20, 2012

(54) INTEGRATED CIRCUIT AND METHOD OF SECURING ACCESS TO AN ON-CHIP MEMORY

(75) Inventors: Cedrick Robini, Nice (FR); Sylvain Duvillard, Cannes (FR)

(73) Assignee: NXP B.V., Eindhoven (NL)

( * ) Notice: Subject to any disclaimer, the term of this patent is extended or adjusted under 35 U.S.C. 154(b) by 935 days.

(21) Appl. No.: 11/994,289

(22) PCT Filed: Jun. 28, 2006

(86) PCT No.: PCT/IB2006/052164
§ 371 (c)(1),
(2), (4) Date: Jun. 3, 2008

(87) PCT Pub. No.: WO2007/004146
PCT Pub. Date: Jan. 11, 2007

(65) Prior Publication Data
US 2008/0235419 A1  Sep. 25, 2008

(30) Foreign Application Priority Data
Jul. 1, 2005 (EP) ..................................... 05300544

(51) Int. Cl.
*G06F 13/10* (2006.01)
(52) U.S. Cl. ...................................................... 711/163
(58) Field of Classification Search .................. None
See application file for complete search history.

(56) References Cited

U.S. PATENT DOCUMENTS

| 2002/0002654 A1 | 1/2002 | Tomohiro | |
|---|---|---|---|
| 2003/0041254 A1 | 2/2003 | Challener et al. | |
| 2003/0221030 A1* | 11/2003 | Pontius et al. | 710/107 |
| 2006/0174056 A1* | 8/2006 | Lambert et al. | 711/103 |

FOREIGN PATENT DOCUMENTS

| EP | 1085521 A1 | 3/2001 | |
|---|---|---|---|
| FR | 2649813 A1 | 1/1991 | |
| WO | 2004084231 A1 | 9/2004 | |
| WO | WO/2004/084231 | * | 9/2004 |

* cited by examiner

*Primary Examiner* — Duc T Doan

(57) ABSTRACT

An integrated circuit having an on-chip access right manager to grant or deny access to a memory segment to a peripheral device such as a CPU (Central Processing Unit), DSP (Digital Signal Processor) or DMA (Direct Memory Access) unit according to predetermined access rights upon reception of a read instruction from the peripheral device, and an on-chip lock connected to a memory data bus, the lock being controllable by the access right manager to block access to a logical one or zero set on each memory data bus wires as long as the access to the memory segment is not granted. Upon reception of the read instruction from the peripheral device, the integrated circuit is configured to start both the process of setting, by the on chip memory, of either a logical one or a logical zero on each of the wires of the memo data bus, as well as the process of granting or refusing the access to the memory segment by the on-chip access right manager to the peripheral device.

7 Claims, 3 Drawing Sheets

INTEGRATED CIRCUIT AND METHOD OF SECURING ACCESS TO AN ON-CHIP MEMORY

FIELD OF THE INVENTION

The present invention relates to integrated circuits and methods of securing access to an on-chip memory.

BACKGROUND OF THE INVENTION

There exist integrated circuits comprising:

a) an on-chip memory data bus having a plurality of conductive wires to communicate data stored in a memory to at least one device, b) an on-chip memory connected to the memory data bus, the on-chip memory being controllable to set either a logical one or a logical zero on each of the wires of the memory data bus according to data stored in a memory segment, so that the data stored in the memory segment can be communicated to at least one peripheral device in response to a read instruction, c) an on-chip access right manager to grant or deny access to the memory segment to the peripheral device according to predetermined access rights upon reception of a read instruction from the peripheral device.

The on-chip memory data bus is directly connected to the peripheral devices. During the operation of the integrated circuit, the access right manager assesses the access rights of each peripheral device that sends a read instruction concerning data stored in the memory segment.

If the peripheral device has a right to access the memory segment, the access right manager grants the access and only then is the on-chip memory controlled to communicate the stored data to the device over the memory data bus.

The operation of assessing the access right of the device and controlling the memory to communicate the stored data take time and slow down the data communication speed between the on-chip memory and the peripheral device.

An example of a memory, access to which is assessed by an access right manager is given in patent application US 2003/0041254 to Challener et al.

SUMMARY OF THE INVENTION

Accordingly, it is an object of the invention to provide an integrated circuit designed to improve the data communication speed between the on-chip memory and the peripheral device.

With the foregoing and other object in view, there is provided, in accordance with the invention, an integrated circuit comprising:

d) an on-chip lock connected to the memory data bus, the lock being controllable by the access right manager to block access to logical one or zero set on each memory data bus wire as long as the access to the memory segment is not granted.

In the above integrated circuit, the lock blocks any access to the memory data bus from the peripheral device as long as access to the memory segment has not been granted. Therefore, control of the on-chip memory to set either logical one or zero on each of the wires of the memory data bus can be started before definitely granting the right to access to this memory segment to the peripheral device. As a result, when access to the memory segment is granted, at least a part of the process to set logical one or zero on the memory data bus wires is already executed, so that time to access data stored in the memory is reduced.

The embodiments of the above integrated circuit may comprise one or several of the following features:

the lock is controllable by the access right manager to connect each wire of the memory data bus to a corresponding wire of an on-chip device data bus connected to a data input port of the peripheral device if access to the memory segment is granted, the lock is controllable by the access right manager to set dummy logical one or zero on each wire of the device data bus if access to the memory segment is denied.

The above embodiments of the integrated circuit present the following advantage:

setting dummy logical one or zero on each device data bus wire erases the previously read data sent on the device data bus and sets each wire to a predetermined state.

The invention also relates to a method of securing access to an on-chip memory within the above integrated circuit, the method comprising that:

a) the on-chip memory sets either a logical one or a logical zero on each of the wires of the memory data bus according to data stored in a memory segment in view of communicating the stored data to a peripheral device in response to a read instruction, b) an on-chip access right manager grants or denies access to the memory segment to the peripheral device according to predetermined access rights upon reception of the read instruction form the peripheral device, c) an on-chip lock connected to the memory data bus blocks access to a logical one or zero set on each memory data bus wires as long as the access to the memory segment is not granted.

The embodiments of the above method may comprise one or several of the following features:

step a) starts before step b) ends.

both steps a) and b) start upon reception of the read instruction sent by the peripheral device, at the end of step b) the lock connects each wire of the memory data bus to a corresponding wire of an on-chip device data bus connected to the peripheral device if access to the memory segment is granted and, alternatively, the lock sets a dummy logical one or zero on each wire of the device data bus if access to the memory segment is denied.

The above embodiments of the method present the following advantages:

starting step a) before step b) speeds up data communication because step a) and b) are at least partially executed in parallel;

starting both step a) and b) at the same time further speeds up the data communication between the memory and the peripheral device.

These and other aspects of the invention will be apparent from the following description, drawings and claims.

DESCRIPTION OF PREFERRED EMBODIMENTS

Figure 1:
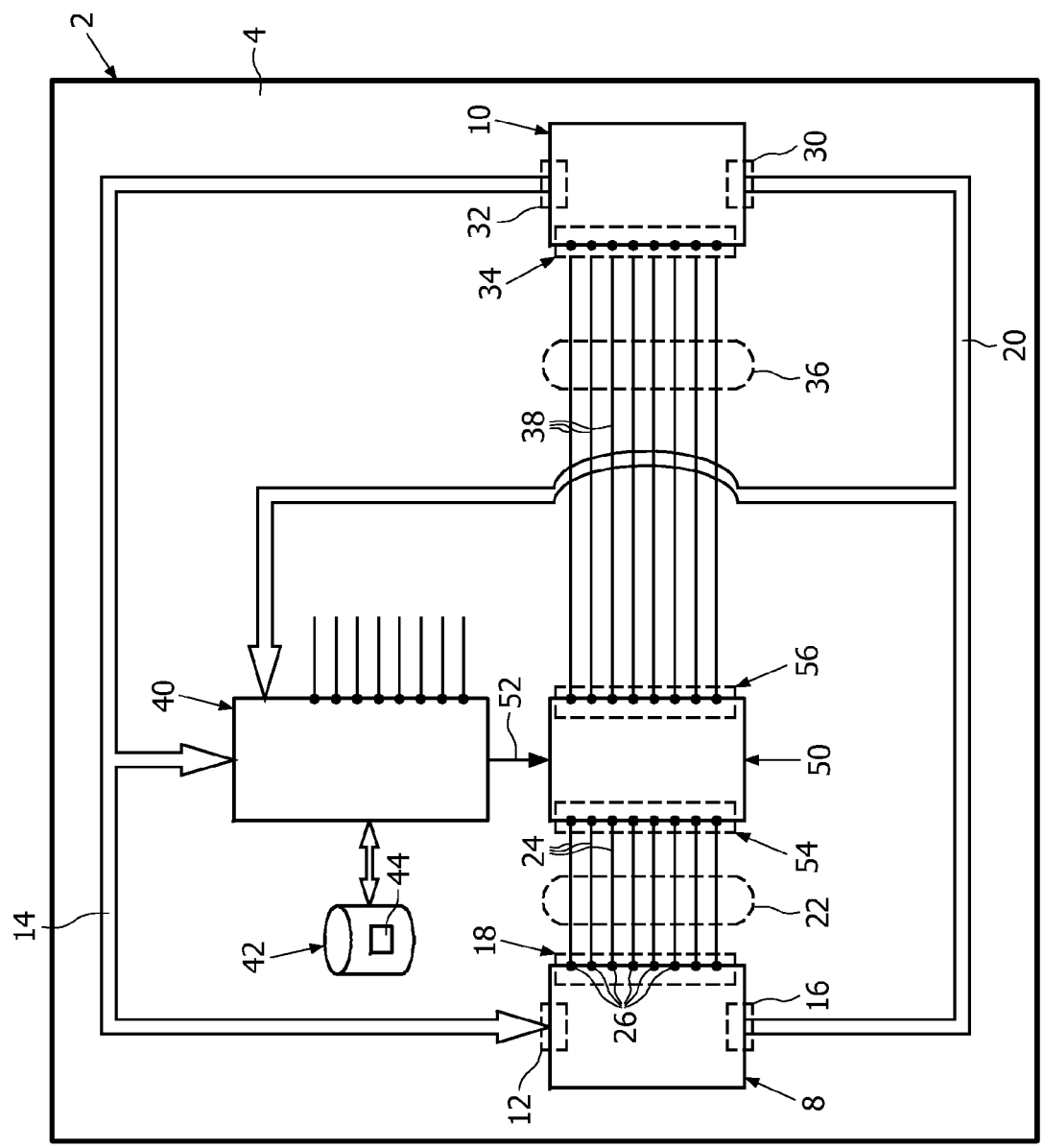
FIG. 1 is a schematic diagram of the structure of an integrated circuit.

FIG. 1 shows an integrated circuit 2 like an ARM processor from the ARM company (refer to website: www.arm.com).

Integrated circuit 2 has a die that forms a chip on which is etched every element of the integrated circuit. FIG. 1 shows only the details of the integrated circuit necessary to understand the invention.

Integrated circuit 2 has at least one on-chip memory 8 that corresponds to a range of memory addresses. This range of memory addresses is, for example, divided into n memory address sub-ranges, each sub-range corresponding to a memory segment, where n is an integer greater than one. For example, memory 8 is a synchronous memory like an SRAM (Static Random Access Memory).

Access to at least one of the memory segments is shared between a plurality of peripheral devices such as CPU (Center Processing Unit), DSP (Digital Signal Processor) or DMA (Direct Memory Access) units. For simplicity, only one peripheral device 10 is shown.

Memory 8 has an address input port 12 connected to an on-chip address bus 14. Port 12 receives the address of the data to be read in memory 8.

Memory 8 has also an instruction input port 16 and a data output port 18.

Port 16 is connected to an on-chip instruction bus 20 to receive read instructions including control signals.

Port 18 is connected to a memory data bus 22 to communicate stored data to peripheral devices like device 10.

Preferably, buses 14, 20 and 22 are pipelined.

In FIG. 1 only the structure of bus 22 has been detailed. Bus 22 has a plurality of parallel conductive wires 24, each wire 24 being connected to an output pin 26 of port 18. For simplicity, only eight wires 24 are shown. Each pin 26 is able to set the voltage of its respective wire 24 to a voltage corresponding either to a logical one or to a logical zero. The logical ones and zeros set on the wires 24 correspond to the value of the data read in memory 8 so that this value can be communicated to a peripheral device.

Device 10 has an output instruction port 30 connected to bus 20 to send read instructions to memory 8 and an address output port 32 connected to bus 14 to specify the address of the data to be read.

Device 10 also includes a data input port 34 connected to a device data bus 36. Bus 36 is used to receive data read in memory 8 when access to this memory is granted.

Bus 36 has as many conductive wires 38 as bus 22, i.e. for instance eight wires. Each wire 38 corresponds to a respective wire 24.

Integrated circuit 2 has an on-chip access right manager 40 to grant or deny access to a specific memory segment of memory 8 to device 10. Manager 40 is connected to a memory 42 comprising a database 44 of access rights for each peripheral device. For example, database 44 specifies for each peripheral device the following data:
  peripheral device identifier,
  memory access type like burst access or non-sequential access,
  privilege of the peripheral device,
  addresses of the memory segments accessible to the peripheral devices.

Manager 40 is able to control a lock 50 to block or unblock a memory segment access from a specific peripheral device according to the access rights of this device stored in database 44.

Manager 40 is connected to lock 50 through a control line 52.

Lock 50 has a data input port 54 connected to bus 22 to receive read data communicated by memory 8 through wires 24 and an output port 56 connected to bus 36.

Lock 50 is controlled by manager 40 to block access to logical one or zero set on each wire 24 from device 10 as long as the access to the memory segment is not granted.

For example, lock 50 is able to connect wires 24 to respective wires 38 when access to memory 8 is granted, so that a data set on wires 24 can propagate through lock 50 to bus 36.

Lock 50 can also set a dummy logical one or zero on each of the wires 38 to communicate a predetermined dummy data to peripheral device, like device 10. Preferably, the dummy data are independent of the data set on bus 22.

The operation of integrated circuit 2 will now be described with reference to FIGS. 2 and 3.

Figure 2:
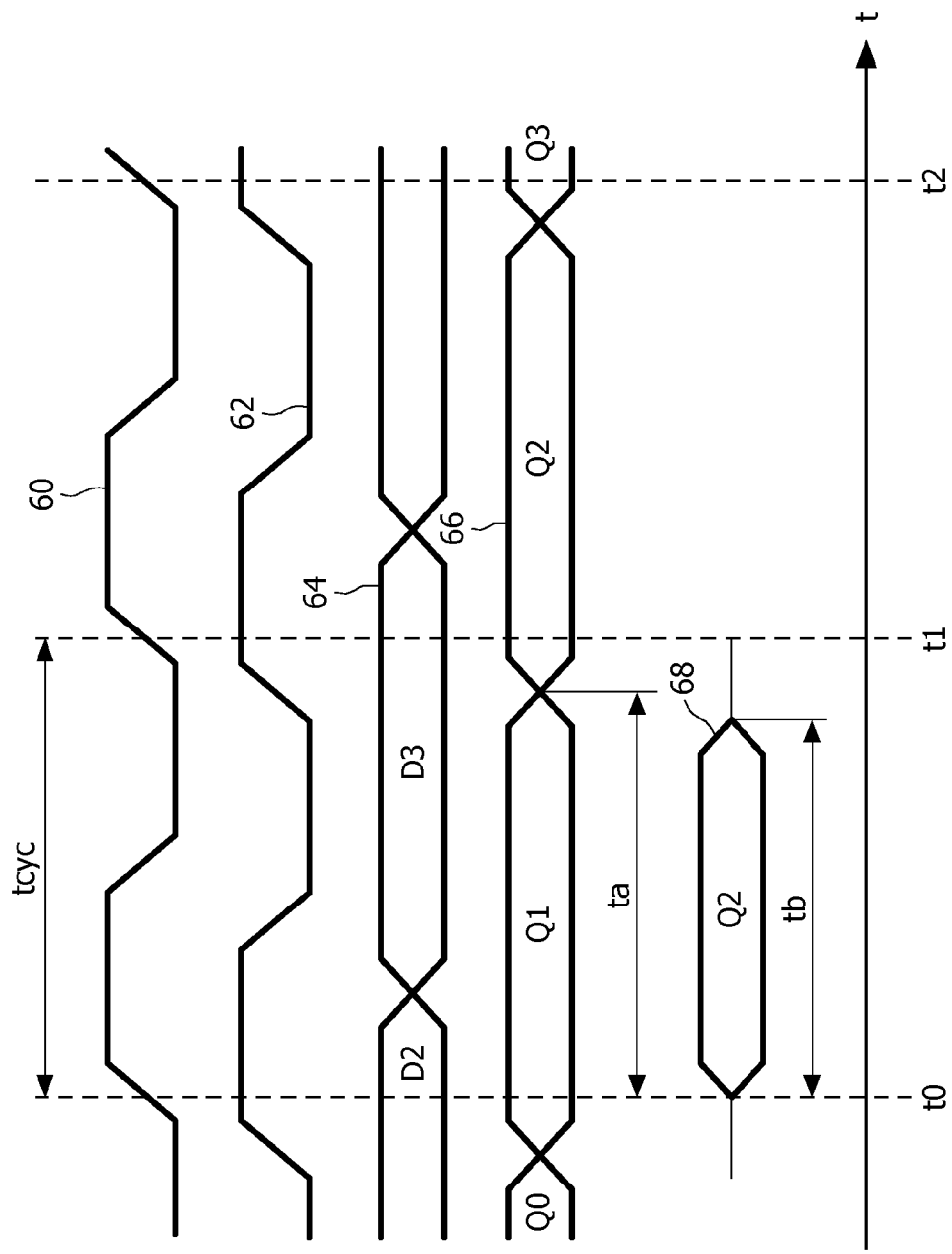
FIG. 2 is a timing chart of different signals used in the integrated circuit of FIG. 1 to access an on-chip memory.

FIG. 2 shows a clock signal 60 according to time t. Clock signal 60 is used to synchronize the operations of memory 8, buses 14, 20, 22 and 36 as well as manager 40. The operations are synchronized with the rising edge of clock signal 60.

In FIG. 2, times $t_0$, $t_1$ and $t_2$ correspond respectively to three successive rising edges of clock 60. A clock cycle $t_{cyc}$ corresponds to one period of clock 60.

A curve 62 represents the value of a chip select signal. Here, the chip select signal is equal to one at time $t_0$ select memory 8.

A curve 64 represents the time at which the address on bus 14 is changed and the read/write instruction is changed. In FIG. 2, at time $t_0$, the address on bus 14 is $D_2$ and at time $t_1$ the address is $D_3$. At times $t_0$ and $t_1$ a read instruction is present on port 16.

A curve 66 represents the data set on bus 22 by memory 8. At time $t_0$, a data $Q_1$ is set on bus 22. Data $Q_1$ corresponds to the data requested by a peripheral device during the previous clock cycle. At time $t_1$, a data $Q_2$ is set on bus 22. Data $Q_2$ corresponds to the data stored at the address $D_2$ read by memory 8 at time $t_0$.

As shown in FIG. 2, it is necessary to wait for a time interval $t_a$ before memory 8 replaces former data $Q_1$ by data $Q_2$ requested at time $t_0$. This interval $t_a$ is known as the "memory access time" of memory 8. Interval $t_a$ corresponds to the time necessary for stored data to go through logical cells of memory 8 before reaching output pins 26. Interval $t_a$ starts at time $t_0$.

For example, interval $t_a$ is equal to 2.83 ns for a single-port SRAM working at the frequency of 125 MHz. This interval $t_a$ is typically shorter than 5 ns.

A curve 68 represents an assess time interval $t_b$ necessary for manager 40 to determine if the access to the memory segment should be granted or denied according to the data present on buses 14 and 20 at time $t_0$. Preferably, the interval $t_b$ starts at time $t_0$ and ends before the end of interval $t_a$.

Here, buses 14, 20, 22 and 36 work as pipelined buses such as for example an ARM AMBA 2.0 bus (AMBA: Advanced Microcontroller Bus Architecture). ARM AMBA bus 2.0 is a bus architecture developed by ARM based on standard AMBA, version 2.0. In a pipelined bus, the read instruction and address are sent in one clock cycle, referred to as "address phase", and the stored data corresponding to the address are read in the following clock cycle, referred to as "data phase".

Here, address $D_2$ is read by memory 8 at time $t_0$ and the corresponding data $Q_2$ are only available on bus 22 in the following clock cycle at time $t_1$.

Figure 3:
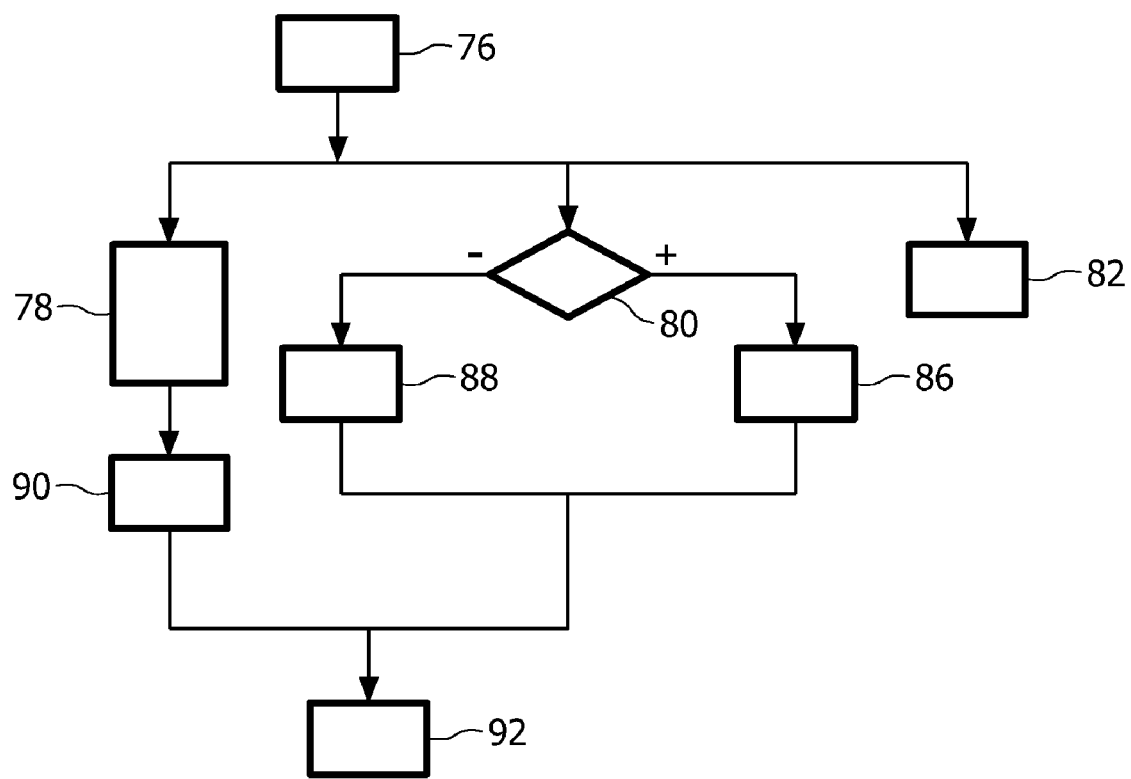
FIG. 3 is a flowchart of a method of securing access to an on-chip memory in the integrated circuit of FIG. 1.

FIG. 3 shows a method of securing access to memory 8 when read from peripheral device 10.

Initially, in step 76, device 10 sends a read instruction on bus 20 and the address of the data to be read on bus 14. The read instruction comprises the device identifier and the requested memory access type. Device 10 sets the chip-select signal of bus 20 also to a logical one corresponding to memory 8.

At time $t_0$, in step 78, upon reception of the read instruction, the memory 8 is controlled to read the data corresponding to the address received on port 12, for instance address $D_2$. Therefore, at time $t_0$, memory 8 starts the process of setting logical ones or zeros on wires 24 according to the data to be read.

In parallel, at time $t_0$, in step 80, manager 40 starts assessing the access rights associated with the identifier of device 10.

Still in parallel, in step 82, as long as manager 40 has not finished assessing the access rights of device 10, lock 50 blocks the access to data present on bus 22. For instance, lock 50 keeps wires 24 disconnected from wires 38.

At time $t_0+t_b$, manager 40 either grants ordenies access to the memory segment corresponding to address $D_2$.

If manager 40 grants access to the memory segment, then manager 40 controls lock 50 through line 52 to unblock the access to bus 22.

For example, in step 86, in response lock 50 connects wires 24 to respective wires 38, so that the data set on bus 22 can propagate to bus 36.

On the contrary, if manager 40 denies access to the memory segment, it controls lock 50 to set dummy data on bus 36. As a result, in step 88, lock 50 sets a dummy logical one or zero on each wire 38. Preferably, the dummy data set is a combination of logical zeros and ones that can be easily identified by device 10.

At time $t_0+t_a$, in step 90, the memory 8 has finished setting a logical one or zero on each of the wires 24 to communicate the read data $Q_2$ to device 10. However, data $Q_2$ is only communicated to device 10 if wires 24 are connected to wires 38 by lock 50. Otherwise, data $Q_2$ remains inaccessible and unreadable for device 10.

At time $t_1$, in step 92, the data set on bus 36 is read by device 10. The read data is equal to the dummy data if lock 50 has blocked access to bus 22 and is equal to the data $Q_2$ if lock 50 has connected wires 24 to wires 38.

Therefore, due to the specific structure of integrated circuit 2, it is possible to assess the rights to access a memory segment of memory 8 during interval $t_a$. Therefore, it is no longer necessary to await the end of interval $t_0$ before reading data $Q_2$ in memory 8 is started.

Many additional embodiments are possible. For example, the rights to access a memory segment may be determined by manager 40 only from the device identifier or only from the address to be read. Any additional information extracted from the read instruction may also be used to grant or deny access to the memory segment.

The structure of the integrated circuit and the method of securing access to a memory segment described herein are also applicable to an asynchronous memory.

A memory segment may be as wide as the whole range of addresses for memory 8.

The above structure and method of securing access to memories can also be applied to a non-pipelined bus.

Lock 50 can be constituted by logical gates like AND gates which set every wire 38 to either a logical one or a logical zero.

Peripheral devices may also not be on-chip peripheral devices, which are connected to the integrated circuit through an appropriate interface.

The invention claimed is:

1. An integrated circuit comprising:
   an on-chip memory data bus having a plurality of conductive wires to communicate data stored in a memory to at least one of peripheral devices,
   an on-chip memory connected to the memory data bus, the on-chip memory being controllable to set either a logical one or a logical zero on each of the wires of the memory data bus according to data stored in a memory segment, so that the data stored in the memory segment can be communicated to at least one peripheral device in response to a read instruction, the operation of setting either a logical one or a logical zero on each of the wires of the memory data bus corresponding to a memory access time interval
   an on-chip access right manager to grant or deny access to the memory segment to the peripheral device according to predetermined access rights upon reception of a read instruction from the peripheral device, the operation of determining whether to grant or refuse access to the memory segment to the peripheral device corresponding to an assess time interval,
   an on-chip lock connected to the memory data bus, the lock being controllable by the access right manager to block access to logical one or zero set on each memory data bus wire as long as the access to the memory segment is not granted,
   wherein the integrated circuit is configured to start both the process of setting, by the on chip memory, of either a logical one or a logical zero on each of the wires of the memory data bus, as well as the process of deciding whether to grant or refuse the access to the memory segment by the on-chip access right manager to the peripheral device, upon reception of the read instruction from the peripheral device, wherein the process of setting either a logical one or a logical zero and the process of deciding whether to grant or refuse the access to the memory segment are performed at least partially at the same time, wherein the process of setting either a logical one o a logical zero is configured to begin before the process of deciding whether to grant or refuse the access to the memory segment, wherein the assess time interval is configured to end before the memory access time interval.

2. The integrated circuit according to claim 1, wherein the lock is controllable by the access right manager to connect each wire of the memory data bus to a corresponding wire of an on-chip device data bus connected to a data input port of the peripheral device if access to the memory segment is granted.

3. The integrated circuit according to claim 2, wherein the lock is controllable by the access right manager to set a dummy logical one or zero on each wire of the device data bus if access to the memory segment is denied.

4. The integrated circuit of claim 1, wherein the process of setting either a logical one or a logical zero and the process of deciding whether to grant or refuse access to the memory segment are configured to begin at approximately the same time.

5. A method of securing access to an on-chip memory within an integrated circuit, the integrated circuit comprising an on-chip memory data bus having a plurality of conductive wires, wherein:
   the on-chip memory sets either a logical one or a logical zero on each of the wires of the memory data bus according to data stored in a memory segment in view of communicating the stored data to a peripheral device upon reception of a read instruction from the peripheral device, the setting either a logical one or a logical zero on each of the wires of the memory data bus corresponding to a memory access time interval;

an on-chip access right manager decides whether to grant or deny access to the memory segment to the peripheral device according to predetermined access rights upon reception of the read instruction from the peripheral device the deciding whether to grant or deny access to the memory segment to the peripheral device corresponding to an assess time interval;

an on-chip lock connected to the memory data bus blocks access to logical one or zero set on each memory data bus wire as long as the access to the memory segment is not granted, and wherein the assess time interval ends before the memory access time interval, and wherein the assess time interval and the memory access interval at least partially overlap, and wherein the memory access time interval begins prior to the assess time interval.

6. The method according to claim 5, wherein the lock connects each wire of the memory data bus to a corresponding wire of an on-chip device data bus connected to the peripheral device if access to the memory segment is granted and, alternatively, the lock sets a dummy logical one or zero on each wire of the device data bus if access to the memory segment is denied.

7. The method according to claim 5, wherein the assess time interval and the memory access time interval begin at approximately the same time.

* * * * *